United States Patent
Find

(10) Patent No.: US 8,475,566 B2
(45) Date of Patent: Jul. 2, 2013

(54) METHOD FOR RECOVERY OF CARBON DIOXIDE FROM A GAS

(75) Inventor: Rasmus Find, Vejle (DK)

(73) Assignee: Union Engineering A/S, Fredericia (DK)

( * ) Notice: Subject to any disclaimer, the term of this patent is extended or adjusted under 35 U.S.C. 154(b) by 818 days.

(21) Appl. No.: 11/664,925

(22) PCT Filed: Jun. 6, 2005

(86) PCT No.: PCT/DK2005/000362
§ 371 (c)(1),
(2), (4) Date: Nov. 26, 2008

(87) PCT Pub. No.: WO2006/037323
PCT Pub. Date: Apr. 13, 2006

(65) Prior Publication Data
US 2009/0101007 A1    Apr. 23, 2009

(30) Foreign Application Priority Data

Oct. 8, 2004   (DK) ................................. 2004 01543
Jan. 7, 2005   (WO) ................. PCT/DK2005/000006

(51) Int. Cl.
  *B01D 53/14*   (2006.01)
(52) U.S. Cl.
  USPC ........ 95/42; 95/172; 95/173; 95/174; 95/177; 95/183; 95/192; 95/193; 95/208; 95/209; 95/236; 96/234; 62/617
(58) Field of Classification Search
  USPC .................. 95/172–177, 41, 42, 235; 96/183, 96/236, 208–209, 228–229; 62/606, 617, 62/622, 929
  See application file for complete search history.

(56) References Cited

U.S. PATENT DOCUMENTS

| | | | |
|---|---|---|---|
| 3,001,373 A | 9/1961 | Eastman et al. | |
| 3,266,220 A | 8/1966 | Woertz | |
| 3,469,410 A * | 9/1969 | Baldus et al. | 62/626 |
| 4,441,900 A * | 4/1984 | Swallow | 62/622 |
| 4,449,994 A * | 5/1984 | Hegarty et al. | 62/622 |
| 4,581,052 A | 4/1986 | Adler et al. | |
| H825 H * | 10/1990 | Green | 62/632 |
| 5,642,630 A * | 7/1997 | Abdelmalek et al. | 62/632 |
| 5,974,829 A | 11/1999 | Novak et al. | |

FOREIGN PATENT DOCUMENTS

| | | |
|---|---|---|
| EP | 1050509 A1 | 11/2000 |
| JP | 2003-081605 A | 3/2003 |
| WO | 03035221 A | 5/2003 |

OTHER PUBLICATIONS

Minutes dated Nov. 2, 2012, from oral proceedings held Oct. 17, 2012, at the EPO for the equivalent European Application No. 05 746 273.1 (21 pages).

Office Action dated Mar. 27, 2012, issued in copending Japanese Patent Appln No. 2007-535018 (8 pages).

* cited by examiner

*Primary Examiner* — Duane Smith
*Assistant Examiner* — Minh-Chau Pham
(74) *Attorney, Agent, or Firm* — Browdy and Neimark, PLLC

(57) ABSTRACT

The present invention relates to a method for recovery of carbon dioxide from a gas stream. The method is a two-step method in which carbon dioxide is compressed in the first step, while the residual carbon dioxide is recovered by an absorption process in a subsequent step. The present invention also relates to the use of the method for the recovery of carbon dioxide and a plant for recovery of carbon dioxide.

18 Claims, 2 Drawing Sheets

Flow diagram for CO2 recovery

METHOD FOR RECOVERY OF CARBON DIOXIDE FROM A GAS

Figure 1:
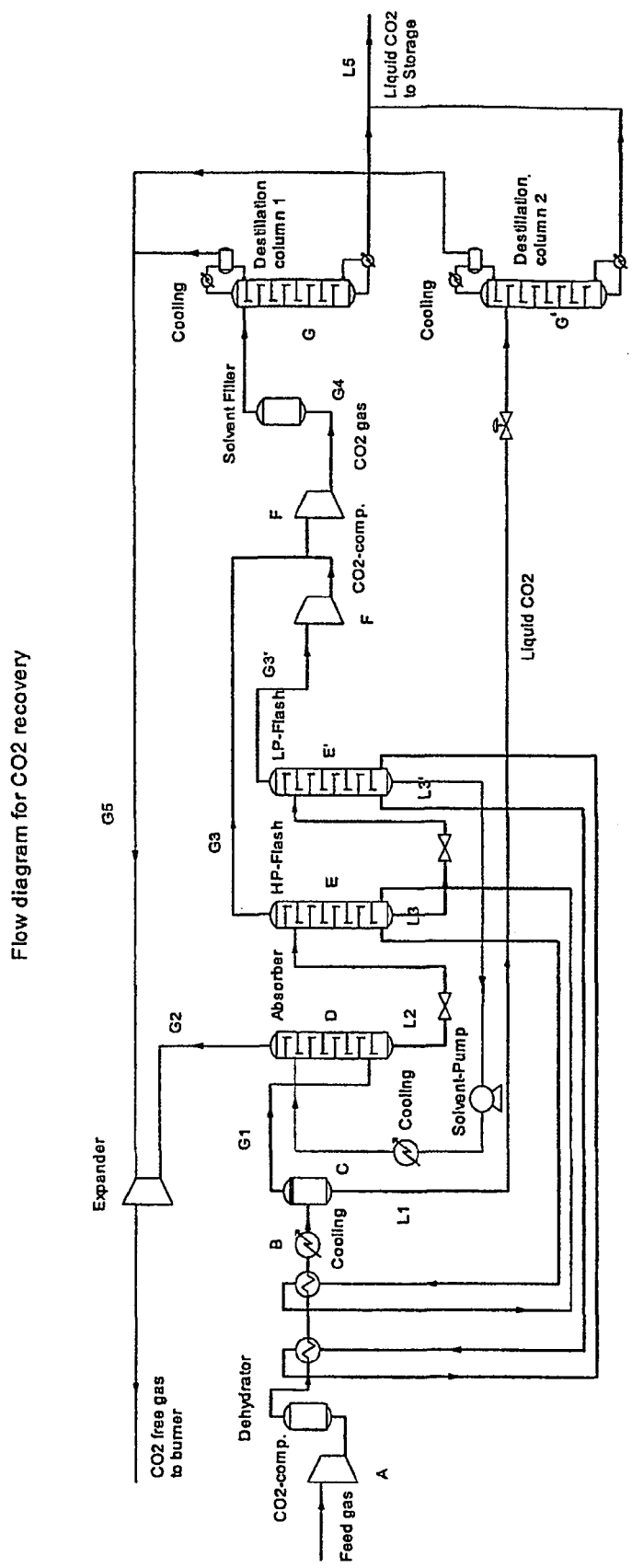

The present invention relates to a method for recovery of carbon dioxide from a gas and uses thereof. More particular, the present invention relates to a two-step method for recovery of carbon dioxide by condensation at a temperature close to but above the triple point of carbon dioxide and a subsequent absorption of the gaseous carbon dioxide, which were not liquefied during condensation. The present invention also relates to a plant for the recovery of carbon dioxide from a gas.

BACKGROUND OF THE INVENTION

Carbon dioxide is a well-known gas, which is present in the atmosphere. It is released to the atmosphere in large amounts by fermentation processes, limestone calcination, and all forms of combustion processes of carbon and carbon compounds. In the recent decades, the attention in respect of said emission has been rising, because of the environmental problem due to future climate change via Greenhouse effect. Consequently, extensive work has been performed over the years in order to develop processes for the removal of carbon dioxide from combustion gases. If possible, a subsequent recovery of carbon dioxide may make those processes economical feasible.

Various methods for removal of a gaseous component from a gas stream are known in the art. Especially, absorption has been mentioned as a suitable method for removal of components from gaseous waste streams. In U.S. Pat. No. 3,266,220 it was proposed to remove carbon dioxide from gaseous mixtures by the utilization of solvents having a selective solubility of carbon dioxide. As examples of selective solvents are mentioned water, methyl alcohol, acetone and propylene carbonate.

It is well-known that the triple point for pure carbon dioxide is situated at $-56.6°$ C. and 5.2 bar. This means that carbon dioxide cannot be found as a liquid at atmospheric pressure irrespective of the temperature. In order to obtain a liquid a temperature above $-56.6°$ C. and a pressure of at least 5.2 bar must be applied.

A method for liquefaction of carbon dioxide from fermentation of alcohol or from other gas sources by condensation following compression is disclosed in European patent application EP 1308502. In this method, the condensation takes place preferably at $-20°$ C. to $-55°$ C. and at a pressure in the range of 19-20 bar. However, no further effort for recovery of uncondensed carbon dioxide is mentioned in said script.

The object of the present invention is to provide a method for recovery of carbon dioxide from a $CO_2$-containing gas.

Surprisingly, the present inventor has found that an improved method for recovery of carbon dioxide from a gas may be obtained by a novel two-step method. By combining an initial condensation of the gas to be treated with a subsequent absorption of the gaseous carbon dioxide, which did not condense in the first step, it is possible to recover carbon dioxide at much higher yields than known in the art and in a financially more feasible way.

DESCRIPTION OF THE INVENTION

The present invention relates to a method for recovery of carbon dioxide from a gas, use of said method, and a plant for recovery of carbon dioxide from a gas.

The method according to the present invention comprises the steps of:

a. feeding a plant with a pressurised $CO_2$-containing gas and/or compressing the $CO_2$-containing gas during feeding,
b. cooling the compressed gas obtained in step a,
c. separating the gas obtained in step b, by use of a condensation procedure by which said gas is separated into a $CO_2$-rich liquid (L1) and a $CO_2$-containing gas (G1),
d. absorbing the gas G1 obtained in step c by means of an absorbing agent, by which the gas G1 is separated into a liquid (L2) and a $CO_2$-poor gas (G2),
e. separating the liquid L2 obtained in step d in order to obtain a $CO_2$-containing gas (G3) and a liquid (L3), and
f. compressing the gas G3 obtained in step e in order to obtain a $CO_2$-containing gas (G4).

In the method according to the invention the carbon dioxide is recovered substantially in two steps. Initially, carbon dioxide is recovered by condensation of the compressed and cooled feed gas. After this gas/liquid separation, the carbon dioxide left in the gas stream is recovered by subjecting said gas stream to an absorption procedure, by which the carbon dioxide present in the gas is absorbed by means of an absorbing agent. Subsequent separation of the carbon dioxide and the absorbing agent yields a second crop of carbon dioxide.

In the first step (step a) of the method according to the present invention a pressure is applied to the feeding gas unless the gas is already at a sufficient elevated pressure prior to feeding. In a preferred embodiment the gas is pressurised during feeding in such a way that the pressure is at least 20 bar. Alternatively, the gas entering the plant is at an elevated pressure of at least 20 bar.

The concentration of carbon dioxide in the feed gas will depend on the origin of said gas. However, in a preferred embodiment, the concentration of carbon dioxide is at least 40% v/v, more preferred at least 45% v/v, and even more preferred at least 50% v/v.

In step b of the method according to the invention the compressed gas is cooled until an appropriate temperature has been reached. As mentioned above it is preferred that the temperature is kept above the triple point at $-56.6°$ C. In a preferred embodiment the gas is cooled until a temperature below $-20°$ C. has been reached. This cooling may be performed in one or more steps. For a person skilled in the art such mathematical calculations in respect of the number and the size of heat exchangers needed in order to optimise the process for this cooling are standard procedure.

The gas, which is now present at an elevated pressure and a decreased temperature, is separated in step c by use of a condensation procedure into a $CO_2$-rich liquid (L1) and a $CO_2$-containing gas (G1). In a preferred embodiment, said condensation procedure is a flash distillation. By the term "$CO_2$-rich liquid" as used herein is meant a liquid phase, wherein the content of liquid $CO_2$ is at least 95 weight-%, more preferred at least 97 weight-%, even more preferred at least 98.5 weight-%.

When performing this flash distillation it is necessary to control the temperature and the pressure in order to ensure condensation of carbon dioxide and in order to prevent deposit of solid carbon dioxide. Preferably, the flash distillation is performed at a pressure by which condensation of 50 to 65% of the carbon dioxide in the gas is recovered.

In a preferred embodiment of the present invention the temperature of the $CO_2$-containing gas G1 leaving the flash distillation column is in the range of $-30°$ C. to $-70°$ C., more preferred from $-44.1°$ C. to $-56°$ C., even more preferred from $-46.1°$ C. to $-50.1°$ C., most preferred from $-47.6°$ C. to $-48.6°$ C., and the pressure of said gas is in the range of 10 bar to 200 bar, more preferred from 12 bar to 50 bar, even more preferred from 20 bar to 40 bar, most preferred from 28 bar to 32 bar. The temperature of the liquid L1 leaving the flash distillation column is in the range of −30° C. to −55° C., more preferred from −45° C. to −53° C., even more preferred from −47° C. to −51° C., most preferred from −48.5° C. to −49.5° C., and the pressure of said liquid is in the range of 10 bar to 200 bar, more preferred from 14 bar to 27 bar, more preferred from 16 bar to 22 bar, most preferred from 17.5 bar to 18.5 bar.

Alternatively, the liquid stream L1 may be cooled to a temperature below −55° C. causing the carbon dioxide to solidify, and consequently removing the product of carbon dioxide from the plant as solid dry ice.

In said flash distillation step more than half of the amount of the carbon dioxide present is recovered in the $CO_2$-rich liquid. However, a considerable amount of carbon dioxide is leaving the flash distillation column in the cold gas stream G1. In order to recover said considerable amount of carbon dioxide the cold gas stream G1 is passed through an absorption column in step d.

In the absorption column the gas G1 is separated into a liquid (L2) containing the major part (that is more than 90%) of the carbon dioxide entering the absorption column and a $CO_2$-poor gas (G2). By the term "$CO_2$-poor gas" as used herein is meant a gas, in which the partial pressure of carbon dioxide is less than 3 bar, preferably less than 1.5 bar, more preferred less than 1 bar.

The absorbing agent used for absorption of gaseous carbon dioxide may be any solvent known to be able to absorb carbon dioxide. However, it is preferred to use an absorbing agent causing a physical absorption, rather than a chemical absorption, of carbon dioxide due to the lower energy consumption needed for the subsequent separation of carbon dioxide from the absorption agent. Examples of preferred absorbing agents are SELEXOL, methanol, and propylene carbonate. At present, the most preferred absorbing agent is methanol. This is due to the fact that the absorption properties of methanol increase with decreasing temperature. Consequently, no heating of the cold gas G1 is required prior to the absorption step. Furthermore, the energy requirement in the subsequent flash distillation is minimised.

SELEXOL is the trade name for an acid gas removal solvent which is a mixture of dimethyl ethers of polyethylene glycol.

The temperature of the liquid L2, when leaving the absorption column, depends on the absorbing agent used. When methanol is used as absorbing agent the temperature of methanol entering the absorption column is in the range of −44° C. to −52° C., more preferred from −46° C. to −50° C., and even more preferred around −48° C. However, when SELEXOL is used as the absorption agent, the temperature of SELEXOL when entering the absorption column is in the range of 0° C. to 10° C., more preferred from 2° C. to 8° C., and even more preferred from 4° C. to 6° C.

This difference is due to the fact that the viscosity of SELEXOL increases as the temperature decreases. At a temperature below about 0° C. the viscosity of SELEXOL has reached a level, where the handling of the liquid becomes difficult. Consequently, when SELEXOL is used as the absorbing agent, the temperature must be kept at a temperature equal to or above 0° C. Furthermore, it will be necessary to warm up the gas stream G1 before said stream enters the absorption column. It is within the knowledge of a person skilled in the art to determine an appropriate temperature of any usable absorbing agent entering the absorption column when the physical properties of said absorbing agent is known.

In cases where the absorbing agent is methanol the temperature of the liquid L2 is in the range of −23.7° C. to −31.7° C., more preferred from −25.7° C. to −29.7° C., most preferred from −27.2° C. to −28.2° C., and the pressure of said liquid is in the range of 26 bar to 50 bar, more preferred from 28 bar to 45 bar, most preferred from 29.5 bar to 30.5 bar.

In cases where the absorbing agent is SELEXOL the temperature of the liquid L2 is in the range 5° C. to 20° C., more preferred from 10° C. to 17° C., even more preferred in the range of 12° C. to 15° C.

In order to separate the carbon dioxide from the absorbing agent the liquid (L2) is preferably flash distilled in the subsequent step e of the process according to the invention. This separation may be performed in one or more consecutive flash-distillation columns. Furthermore, the flash distillation may be performed as a low pressure process or as a high pressure process or a combination of both. It is within the knowledge of a skilled person to combine the number, size and type of flash distillation columns in order to obtain the combination most feasible.

In cases where methanol is used as the absorbing agent in step d, the temperature of the $CO_2$-containing gas G3 when leaving the flash distillation column is in the range of −23.5° C. to −33.5° C., more preferred from −25.5° C. to −31.5° C., most preferred from −27.5° C. to −29.5° C. The pressure of said gas is in the range of 5 bar to 20 bar in cases where the gas G3 is leaving a high pressure column and in the range of a negative pressure of 0.5 bar to a pressure of 3 bar when leaving a low pressure column.

The gas leaving the flash distillation column(s) is subsequently compressed (step f). It is standard procedure for a skilled person to determine the number and size of compressors necessary in order to perform this compression step in the most suitable way. If more than one flash distillation column is used, the gas leaving each column may be compressed separately before mixing. Alternatively, the gases leaving each column may be mixed before compressing.

In cases where methanol is used as the absorbing agent, the temperature of the gas G4, when entering the distillation column, is in the range of −44° C. to −52° C., more preferred from −46° C. to −50° C., most preferred from −47.5° C. to −48.5° C., and the pressure of said liquid is in the range of 14 bar to 22 bar, more preferred from 16 bar to 20 bar, most preferred from 17.5 bar 18.5 bar.

Almost every gas produced in combustion processes contains water to some extent. If water is present in the gas to be treated by the method according to the present invention it must be removed in order to prevent deposit of solid water in the plant. Consequently, in a preferred embodiment of the invention water is removed before cooling of the gas in step b. The water is preferably removed to such an extent that the pressure dew point of water is below −55° C.

The various methods for removing water from gases lies within the knowledge of a person skilled in the art, who easily may determine the most suitable method, which depends on the chemical composition of the gas to be treated. Examples of such methods are adsorption with molecular sieves, silica gel, activated alumina and other absorbents suitable for dehydration to a low water dew point.

The liquid L3 leaving the flash distillation column(s) in step e is substantially composed of absorbing agent, wherein a low concentration of carbon dioxide is present. If no reuse of the absorbing agent is provided for, large amounts of absorbing agent must be disposed of. Thus, in a preferred embodiment said liquid is re-circulated to the absorption column. As a result, the waste of absorbing agent is reduced significantly and the recovery of carbon dioxide is increased.

The gas G4 contains absorbing agent in small amounts when entering the distillation column if no special effort for removing this impurity has been made. Therefore, in a preferred embodiment the traces of absorbing agent are removed from the liquid obtained in step f by a filtration method.

A person skilled in the art would know how to perform this filtration in the most suitable way depending on the chemical composition, the temperature, and the pressure of the gas G4 leaving the compressors in step f. Examples of suitable methods are adsorption with molecular sieves, silica gel, activated alumina, activated carbon and other absorbents suitable for removal of organic compounds from carbon dioxide gases.

The liquid L1 and the gas G4 obtained in step c and step f, respectively, may be distilled in order to purify the liquid carbon dioxide. Said two streams may be mixed inside the distillation column, or they may be distilled separately, and then mixed before storage. If filtration of the gas G4 as described above is included in the method this filtration step takes place prior to the distillation.

In the method according to the present invention the gases G2 and G5 obtained from the absorption column in step d and the above-mentioned distillation column(s), respectively, are either recycled or is disposed of by burning. In a preferred embodiment said gases are expanded prior to burning in order to recover energy.

The purity of the liquid carbon dioxide L5 leaving the distillation column(s) will depend on the process parameters in each step of the method. Conditional upon the subsequent use of the product different grades of purity is required. If, for example, the subsequent use is the incorporation of carbon dioxide as a component in a food product, the liquid carbon dioxide must be substantially absolute pure. By contrast, if the subsequent use is in a fire extinguisher the requirements towards purity is less stringent. However, in a preferred embodiment the product is at least 99.5% pure.

Examples of preferred uses of the produced liquid carbon dioxide are the incorporation as a food grade component in soft drinks and other food products.

Carbon dioxide may be recovered from all kinds of gases. In general, all gases with a partial pressure of carbon dioxide above a certain value in order for the carbon dioxide to be condensed and in a mixture of components, which after condensation may be separated by distillation, can be treated in the method according to the present invention. However, it is an object of the present invention to use the present method for the recovery of carbon dioxide from a gas coming from a plant for the manufacture of hydrogen or for the manufacture of Syngas.

In the most preferred embodiment the feeding $CO_2$-containing gas is a waste gas originating from a plant for the manufacture of hydrogen and the gases G2 and G5 is recycled to said plant for manufacture of hydrogen.

The present invention also relates to a plant for the recovery of carbon dioxide from a gas stream. Such a plant (shown in the form of a flow diagram in FIG. 1) comprises optionally a compressor (A) connected to a cooling unit (B), said cooling unit being connected to a condensation unit (C) having a gas outlet and a liquid outlet, the gas outlet of said condensation unit (C) being connected to an absorption column (D) with a gas outlet and a liquid outlet, said outlet for liquid being connected to one or more consecutive separation units (E) each having a gas outlet and a liquid outlet, the gas outlets of said separation units (E), being connected to one or more compressors (F), and the outlet of said compressor(s) (F) and the outlet of the liquid outlet from the condensation unit (C) optionally being connected to one or more distillation columns (G).

The compressors A and F, respectively, may be any kind of compressor suitable for compressing the gas to be treated. As examples of suitable compressors, centrifugal, screw, and reciprocating compressors may be mentioned. Especially preferred compressors are those having high polytropic efficiency and thereby low power consumption.

The cooling unit B may be any kind of refrigerator capable of cooling a pressurised gas. A person skilled in the art can easily select a suitable cooling unit dependent on the required temperature to be reached and the chemical composition of the gas to be treated.

The condensation unit (C) and the separation unit(s) (E) are preferably flash distillation columns. Said columns may be any kind of flash distillation columns known in the art. A skilled person may easily determine whether one or more high pressure flash distillation column(s) or one or more low pressure distillation column(s) or a combination thereof is needed in order to obtain the result required in each step. It will also be within the knowledge of the skilled person to determine whether the desired result is achieved most suitable by using only one column, or by using two or more columns connected in series or in parallel.

The absorption column (D) to be used may be any column known in the art suitable for the performance of absorbing gaseous carbon dioxide into an absorbing agent. The most suitable absorption columns to be used are normally packed columns with a low pressure drop, but also trayed columns may be employed.

In a preferred embodiment the plant comprises a dehydrator in order to remove water from the gaseous stream. The process of dehydrating a gaseous stream is well-known in the art, and a suitable dehydrator to perform the dehydration is easily selected by the skilled person. However, dehydration units TSA adsorber with molecular sieves are preferably employed.

In yet another preferred embodiment the plant according to the present invention further comprises a filter for removal of traces of absorbing agent. It is within the knowledge of a skilled person to select the most appropriate kind of filter when the parameters such as type of absorbing agent as well as the temperature and pressure of the liquid to be filtrated are known. Examples of preferred filters are filter units TSA adsorber with molecular sieves or activated carbon.

The distillation column(s) (G) may be any kind of column known in the art suitable for distilling liquid carbon dioxide. The most suitable distillation columns to be used are normally packed columns with a low pressure drop, but also trayed columns may be employed.

As mentioned above, the gases G2 and G5 may be expanded before they are disposed of by burning in order to recover energy. Actually, an energy recovery about of 8-10% is possible. Consequently, a preferred embodiment is directed to the plant comprising an expander for this purpose. A turbo expander, for generating electrical energy or direct compression is an example of a suitable expander, which may be used in the plant.

It is within the standard procedure of a skilled person to calculate the numbers and sizes of each of the above-mentioned units of the plant when the mass flow, the chemical composition, the temperature, and the pressure of each stream is known in order to obtain the most feasible mode of operating the plant.

When selecting suitable materials for each of said units, special consideration must be directed to the temperature, the pressure, and the chemical and physical properties of the gases and liquids to be treated. However, such consideration will be within the knowledge of a person skilled in the art.

Furthermore, a skilled person can easily acknowledge that the selection and control of process parameters will depend on the chemical composition of the gas entering the plant as well as the chemical composition and physical condition of the gases and liquids in each step of the method. Calculations for determining the number and size of heat exchangers in order to minimize the energy consumption for cooling is standard procedure for a person skilled in the art.

Figure 2:
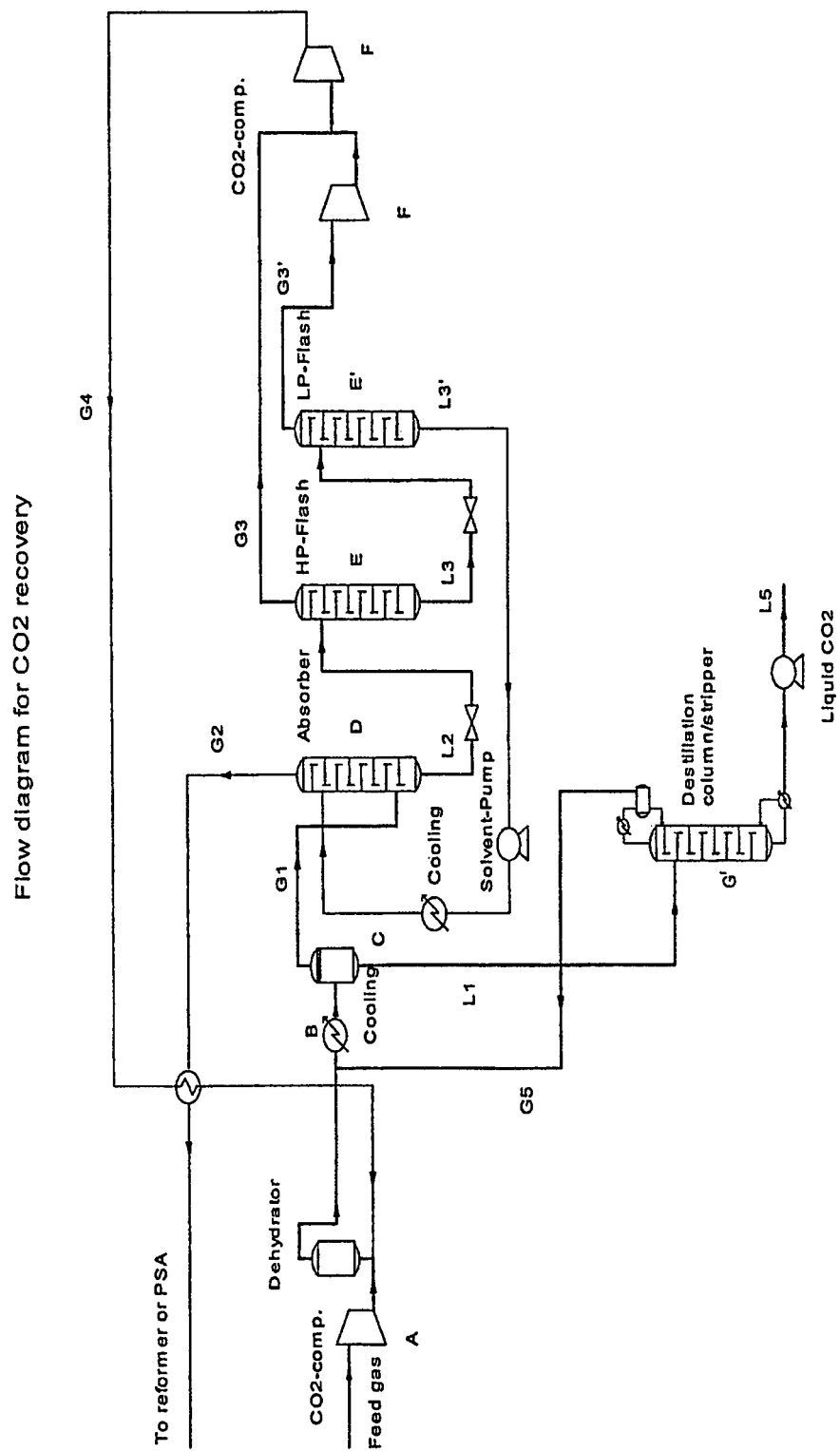

An alternative plant for performing the recovery of carbon dioxide from a gas stream according to the present invention is shown in FIG. 2.

The plant shown in FIG. 2 differs from the plant shown in FIG. 1 in the way that no distillation of the gas stream G4 occurs, and that said gas stream G4 is recycled and mixed with the pressurised feeding stream prior to the optional dehydrator unit. Also the gas stream G5 leaving the distillation column G' is recycled and mixed with the pressurised feeding stream after the optional dehydrator unit. Furthermore, the gas stream G2 is recycled. In a preferred embodiment the gas stream G2 is recycled to the plant for the manufacture of hydrogen.

In the following the invention is described in more detail with reference to a preferred embodiment and to FIG. 1. Said figure depicts a schematic flow diagram for the $CO_2$ recovery according to the present invention.

Data with respect to pressure and temperature as well as the composition of the major chemical components are given in the table below. All references to pressures are to the total pressure.

TABLE

Physical and chemical properties of selected gas and liquid streams.

| | Pressure (bar) | Temp. (° C.) | $CO_2$ (kg/h) | water (kg/h) | methane (kg/h) | methanol (kg/h) |
|---|---|---|---|---|---|---|
| Feed gas | 1.3 | 30 | 26760 | 163 | 2568 | n.d. |
| gas entering the dehydrator | 31 | 10 | 26760 | 10 | 2568 | n.d. |
| gas entering column (C) | 30 | −39 | 26760 | n.d. | 2568 | n.d. |
| gas leaving column (C) (G1) | 30 | −48 | 12382 | n.d. | 2451 | n.d. |
| liquid leaving column (C) (L1) | 18 | −49 | 14378 | n.d. | 118 | n.d. |
| gas leaving column (D) (G2) | 18 | −50 | 919 | n.d. | 2177 | 1 |
| liquid leaving column (D) (L2) | 30 | −28 | 14900 | n.d. | 274 | 62561 |
| gas leaving column (E) (G3) | 7 | −30 | 1332 | n.d. | 146 | 1 |
| liquid leaving column (E) (L3) | 7 | −30 | 13385 | n.d. | 81 | 62560 |
| gas leaving column (E') (G3') | 1.2 | −45 | 9868 | n.d. | 81 | 7 |
| gas entering the filter | 23 | 30 | 11200 | n.d. | 226 | 8 |
| gas entering column (G) (G4) | 18 | −49 | 11043 | n.d. | 170 | n.d. |
| liquid leaving column (G + G') (L5) | 18 | −29 | 24578 | n.d. | n.d. | n.d. |
| gas leaving columns (G + G') (G5) | 18 | −42 | 1277 | n.d. | 294 | n.d. | n.d.: not detectable

The gas fed to the plant is a PSA off gas, which comes from a hydrogen plant. The gas enters the plant at a temperature of about 30° C., and a pressure of about 1.3 bar. The mass flow of the feeding stream is about 34440 kg/hr in total, wherein the mass flow of carbon dioxide amounts to 26760 kg/hr. The further chemical components are water (163 kg/hr), methane (2568 kg/hr), nitrogen (145 kg/hr), hydrogen (752 kg/hr), and carbon monoxide (4050 kg/hr).

During feeding the gas is compressed in a turbo compressor. After compression the gas is entering the dehydrator at a pressure of 31 bar and a temperature of 10° C., the lower temperature being a result of a pre-cooling of the compressed gas. In the dehydrator, which is of the type Activated alumina/molecular sieve TSA adsorber, water is removed to such an extent that the content in the gas leaving the dehydrator is not detectable.

In the subsequent step the gas is cooled to a temperature about −39° C. For this cooling procedure a refrigeration plant is employed. This refrigeration plant is a cascade system with $CO_2/NH_3$ as refrigerant. The $CO_2$ loop cools to −48° C. and the $NH_3$ loop cools to −29° C.

When entering the flash distillation column (C) the chemical composition of the compressed and cooled gas is unchanged compared to the feeding gas except for the removed of water. The flash distillation column is a simple knock out drum. As a consequence of the flash distillation process the carbon dioxide is divided into a liquid stream (L1) and a gas stream (G1).

Liquid carbon dioxide (L1) is leaving the flash distillation column at a pressure of 18 bar and a temperature of −49° C. with a mass flow of 14378 kg/hr and only containing traces of methane (118 kg/hr) and hydrogen, nitrogen, and carbon monoxide in even smaller amounts. In the subsequent distillation of said liquid these traces of impurities are removed to such an extent as being non-detectable in the liquid leaving the column. For this procedure a packed distillation column (G') is employed.

The mass flow of carbon dioxide in the gas stream leaving said flash distillation column (C) amounts to 12382 kg/hr. This carbon dioxide is recovered in a subsequent absorption procedure using methanol as the absorbing agent. More precisely, the absorbing agent is a grade AA methanol having a water content of 0.1%. The absorption column (D) is a packed column. The carbon dioxide is leaving the absorption column either in the gas phase (G2) or as an absorbed component in the liquid phase (L2).

The gas phase (G2) is leaving the column (D) at a pressure of 18 bar and a temperature of −50° C. The mass flow of carbon dioxide in the gas phase is only 919 kg/hr, while the mass flow of methane is 2177 kg/hr. The liquid phase (L2) is leaving the column (D) at a pressure of 30 bar and a temperature −28° C. The mass flow of carbon dioxide in the liquid phase leaving said column is 14900 kg/hr. Also a considerable amount of methane (274 kg/hr) is to be found in said liquid phase.

The liquid phase L2 is subsequently flash distilled in two consecutive flash distillation columns. The first column (E) is a high pressure column and the second column (E') is a low pressure column. In the high pressure column carbon dioxide is flashed at elevated pressure to recover carbon dioxide to the inter stage pressure of the compressor, and hereby minimising the energy consumption. This column is a packed column. The residual carbon dioxide is recovered by flashing at a lower pressure. Further, the solvent is re-boiled to ensure a high recovery of carbon dioxide at the top of the absorber and thereby ensure low residual carbon dioxide in the liquid. It is also possible to use a vacuum flash in order to further reduce the amount of carbon dioxide in the liquid.

The pressure and the temperature of the gas G3 as well as of the liquid L3 leaving the high pressure flash column is 7 bar and −30° C., respectively. The mass flows are given in the table. The liquid phase L3 is passed on to the low pressure flash distillation column (E'). The pressure and the temperature of the gas (G3') leaving the low pressure column is 1.2 bar and −45° C. The liquid phase leaving the low pressure column is recycled to the absorption column in order to reuse the methanol. At the same time the carbon dioxide left in said liquid phase is not wasted but returned to the absorption column.

The gas stream leaving the low pressure column is compressed before mixed with the gas stream leaving the high pressure column. Subsequently the mixture of said two gases is further compressed in order to obtain a pressure of 23 bar at a temperature of 30° C. before said mixture is entering the filtration unit in order to remove traces of methanol. Actually, in this preferred embodiment the concentration of methanol is decreased to such an extent that it cannot be detected in the stream leaving the filtration unit. A molecular sieve TSA adsorber is used as filter, while the compressors are oil lubricated screw compressors.

The filtrated liquid stream is passed on to a distillation column (G) at a pressure of 18 bar and a temperature of −49° C. The liquid leaving this distillation column (G) is mixed with the liquid leaving the distillation column (G') before storage. The mass flow of carbon dioxide in this streams (G+G') is 24578 kg/hr and equals the total mass stream as it does not contain any detectable impurities.

The gases leaving the two distillation columns are mixed before they are entered into a turbo expander. Also the gas leaving the absorber G2 is entered into the turbo expander. The gas leaving the turbo expander is disposed of by burning. The purpose of expanding said gases is to recover energy. In this preferred embodiment an energy recovery of 3% was obtained. Cold and hot streams not described are used for energy minimisation.

The invention claimed is:

1. A method for recovery of $CO_2$ from a $CO_2$-containing gas comprising the steps of:
   a. feeding a plant with a pressurised $CO_2$-containing gas and/or compressing the $CO_2$-containing gas during feeding,
   b. cooling the compressed gas obtained in step a,
   c. separating the gas obtained in step b by a condensation procedure, by which said gas is separated into a $CO_2$-rich liquid (L1) and a $CO_2$-containing gas (G1),
   d. absorbing the gas G1 obtained in step c with a physical liquid absorbing agent selected from the group consisting of SELEXOL, methanol, propylene carbonate and mixtures thereof, by which the gas G1 is separated into a liquid (L2) and a $CO_2$-poor gas (G2),
   e. separating the liquid L2 obtained in step d in order to obtain a $CO_2$-containing gas (G3) and a liquid (L3),
   f. compressing the gas G3 obtained in step e in order to obtain a $CO_2$-containing gas (G4),
   g. distilling the liquid L1 obtained in step c in order to recover liquid $CO_2$ (L5) and a gas (G5) substantially free of $CO_2$, and
   h. processing gas G5 for recycle.

2. A method according to claim 1, wherein said $CO_2$-containing gas in step a either is fed to the plant as a pressurised gas having a pressure of at least 20 bar, or is compressed during feeding in such a way that the pressure is at least 20 bar.

3. A method according to claim 1, wherein the compressed gas in step b is cooled until a temperature below −20° C. has been reached.

4. A method according to claim 1, wherein the condensation procedure in step c is a flash distillation.

5. A method according to claim 1, wherein the temperature of the $CO_2$-containing gas G1 obtained in step c is in the range of −30° C. to −70° C., and the pressure of said gas is in the range of 10 bar to 200 bar, and the temperature of the liquid L1 obtained in step c is in the range of −30° C. to −55° C., and the pressure of said liquid is in the range of 10 bar to 200 bar.

6. A method according to claim 1, wherein the separating of the liquid L2 in step e is a flash distilling process.

7. A method according to claim 1, wherein the liquid L2 is flash distilled in one or more consecutive flash distillation steps and wherein the gases obtained from each flash distillation steps is compressed before or after mixing.

8. A method according to claim 1, wherein the method further comprises the step of removing water from the gas prior to cooling of the gas in step b.

9. A method according to claim 1, wherein the liquid L3 obtained in step e is re-circulated and mixed with the absorbing agent used for absorbing the gas G1 in step d.

10. A method according to claim 1, wherein the method further comprises the step of filtrating the gas G4 obtained in step f.

11. A method according to claim 1, wherein the method further comprises the step of distilling the liquid L1 obtained in step c and the gas G4 obtained in step f in order to recover liquid $CO_2$ (L5) and a gas (G5) substantially free of $CO_2$.

12. A method according to claim 11, wherein the liquid stream L1 and the gas stream G4 are distilled separately or are combined in the distillation column.

13. A method for recovery of $CO_2$ from a $CO_2$-containing gas comprising the steps of:
   a. feeding a plant with a pressurised $CO_2$-containing gas and/or compressing the $CO_2$-containing gas during feeding,
   b. cooling the compressed gas obtained in step a,
   c. separating the gas obtained in step b by use of a condensation procedure, by which said gas is separated into a $CO_2$-rich liquid (L1) and a $CO_2$-containing gas (G1),
   d. absorbing the gas G1 obtained in step c by means of a physical absorbing agent, by which the gas G1 is separated into a liquid (L2) and a $CO_2$-poor gas (G2),
   e. separating the liquid L2 obtained in step d in order to obtain a $CO_2$-containing gas (G3) and a liquid (L3),
   f. compressing the gas G3 obtained in step e in order to obtain a $CO_2$-containing gas (G4), and
   g. distilling the liquid L1 obtained in step c in order to recover liquid $CO_2$ (L5) and a gas (G5) substantially free of $CO_2$;

wherein the gas G2 obtained in step d and the gas G5 is processed for reuse or is disposed of by burning; and wherein the gases G2 and G5 are expanded prior to burning in order to recover energy.

14. A method according to claim 1, wherein the liquid $CO_2$ (L5) produced is preferably at least 99.5% pure.

15. A method for recovery of $CO_2$ from a $CO_2$-containing gas comprising the steps of:
  a. feeding a plant with a pressurised $CO_2$-containing gas and/or compressing the $CO_2$-containing gas during feeding,
  b. cooling the compressed gas obtained in step a,
  c. separating the gas obtained in step b by use of a condensation procedure, by which said gas is separated into a $CO_2$-rich liquid (L1) and a $CO_2$-containing gas (G1),
  d. absorbing the gas G1 obtained in step c by means of a physical absorbing agent, by which the gas G1 is separated into a liquid (L2) and a $CO_2$-poor gas (G2),
  e. separating the liquid L2 obtained in step d in order to obtain a $CO_2$-containing gas (G3) and a liquid (L3),
  f. compressing the gas G3 obtained in step e in order to obtain a $CO_2$-containing gas (G4), and
  g. distilling the liquid L1 obtained in step c in order to recover liquid $CO_2$ (L5) and a gas (G5) substantially free of $CO_2$;
  wherein the $CO_2$-containing gas is a waste gas from the manufacture of hydrogen and the gases G2 and G5 are recycled to the plant for manufacture of hydrogen.

16. A method for recovery of $CO_2$ from a $CO_2$-containing gas comprising the steps of:
  a. feeding a plant with a pressurised $CO_2$-containing gas and/or compressing the $CO_2$-containing gas during feeding,
  b. cooling the compressed gas obtained in step a,
  c. separating the gas obtained in step b by use of a condensation procedure, by which said gas is separated into a $CO_2$-rich liquid (L1) and a $CO_2$-containing gas (G1),
  d. absorbing the gas G1 obtained in step c by means of a physical absorbing agent, by which the gas G1 is separated into a liquid (L2) and a $CO_2$-poor gas (G2),
  e. separating the liquid L2 obtained in step d in order to obtain a $CO_2$-containing gas (G3) and a liquid (L3),
  f. compressing the gas G3 obtained in step e in order to obtain a $CO_2$-containing gas (G4), and
  g. distilling the liquid L1 obtained in step c in order to recover liquid $CO_2$ (L5) and a gas (G5) substantially free of $CO_2$;
  wherein the gas G4 obtained in step f is recycled and mixed with the pressurised feeding stream obtained in step a, and wherein the gas G5 obtained in step g is recycled and mixed with the pressurised feeding stream obtained in step a.

17. A method according to claim 1, wherein the gas stream G2 is recycled to a plant for the manufacture of hydrogen.

18. A plant for recovery of $CO_2$ from a $CO_2$-containing gas comprising optionally a compressor (A) connected to a cooling unit (B), said cooling unit being connected to a condensation unit (C) having a gas outlet and a liquid outlet, the gas outlet of said condensation unit (C) being connected to an absorption column (D) with a gas outlet and a liquid outlet, said outlet for liquid being connected to one or more consecutive flash distillation columns (E) each having a gas outlet and a liquid outlet, the gas outlets of said flash distillation column(s) (E), being connected to one or more compressors (F), and the outlet of said compressor(s) (F) optionally being connected to one or more distillation columns (G) and the outlet of the liquid outlet from the condensation unit (C) being connected to one or more distillation columns (G');
  further comprising an expander for expanding the gas G2 leaving the absorption column (D) and the gas G5 leaving the distillation column(s) (G) in order to recover energy.

* * * * *